United States Patent
Haimovich et al.

[19]

[11] Patent Number: 6,144,298

[45] Date of Patent: Nov. 7, 2000

[54] ELECTRONIC FILAMENT NETTING

[75] Inventors: Yosef Haimovich, Rishon le Zion; Yehuda Armoni, Reut; Michael Auerbach, Maccabim, all of Israel

[73] Assignee: Hi-G-Tek Ltd., Or-Yehuda, Israel

[21] Appl. No.: 09/385,341

[22] Filed: Aug. 30, 1999

[30] Foreign Application Priority Data

Aug. 31, 1998 [IL] Israel ......................................... 126007

[51] Int. Cl.⁷ ..................................................... G08B 13/26
[52] U.S. Cl. ........................... 340/564; 340/541; 340/550; 340/565; 340/566; 340/571
[58] Field of Search ..................... 340/564, 541, 340/550, 565, 566, 571, 568.1

[56] References Cited

U.S. PATENT DOCUMENTS

| | | | |
|---|---|---|---|
| 4,748,668 | 5/1988 | Shamir et al. | 380/30 |
| 5,677,674 | 10/1997 | Wolf | 340/541 |
| 5,912,623 | 6/1999 | Pierson | 340/573.4 |

FOREIGN PATENT DOCUMENTS

| | | | |
|---|---|---|---|
| 0715283 | 6/1996 | European Pat. Off. | G08B 13/12 |
| WO 87/06749 | 11/1987 | WIPO | G08B 13/12 |

*Primary Examiner*—Benjamin C. Lee
*Attorney, Agent, or Firm*—Abelman, Frayne & Schwab

[57] ABSTRACT

An electronic filament netting including a warp of a first plurality of wires woven together with a weft of a second plurality of wires, wherein a random number of the warp and the weft wires are electrically connected to electronic monitoring apparatus so as to create a random electrical connection which defines an initial electrical parameter, wherein a change in the initial electrical parameter is communicated to the electronic monitoring apparatus.

15 Claims, 4 Drawing Sheets

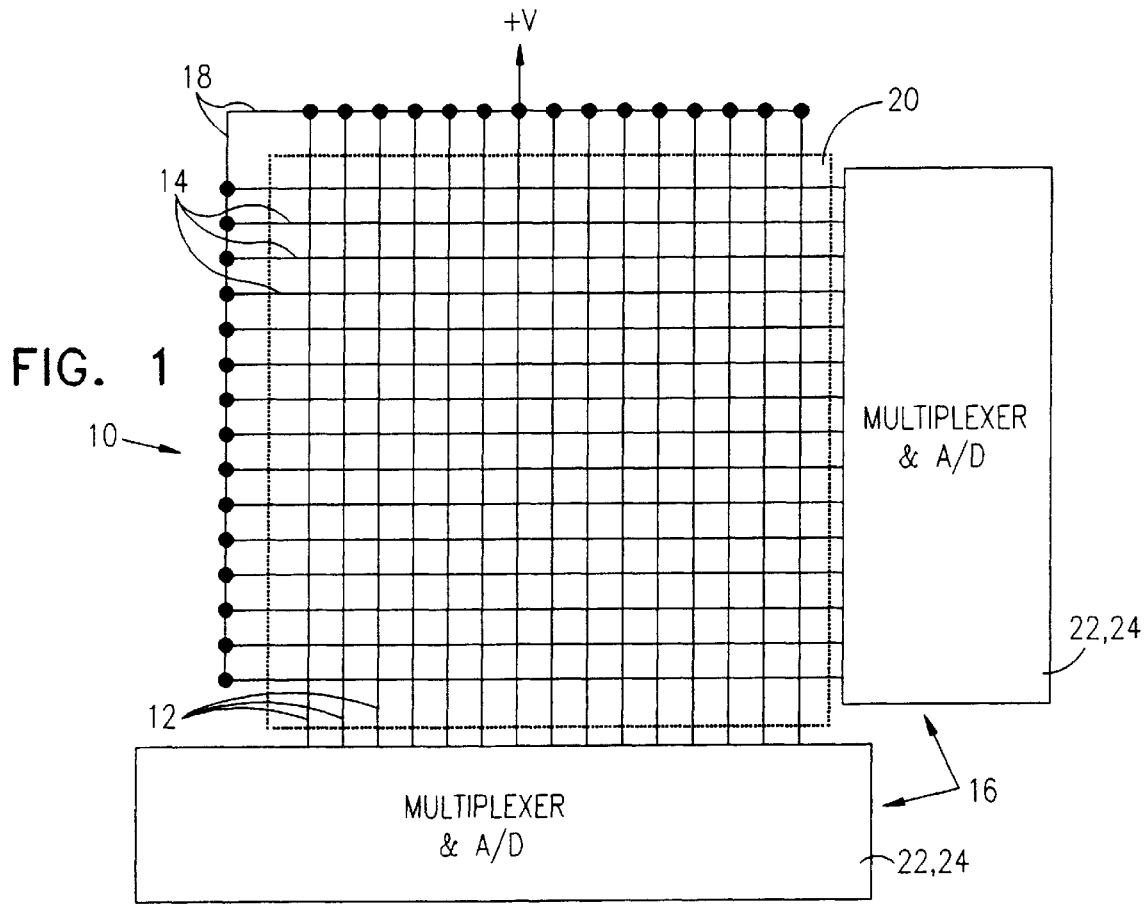
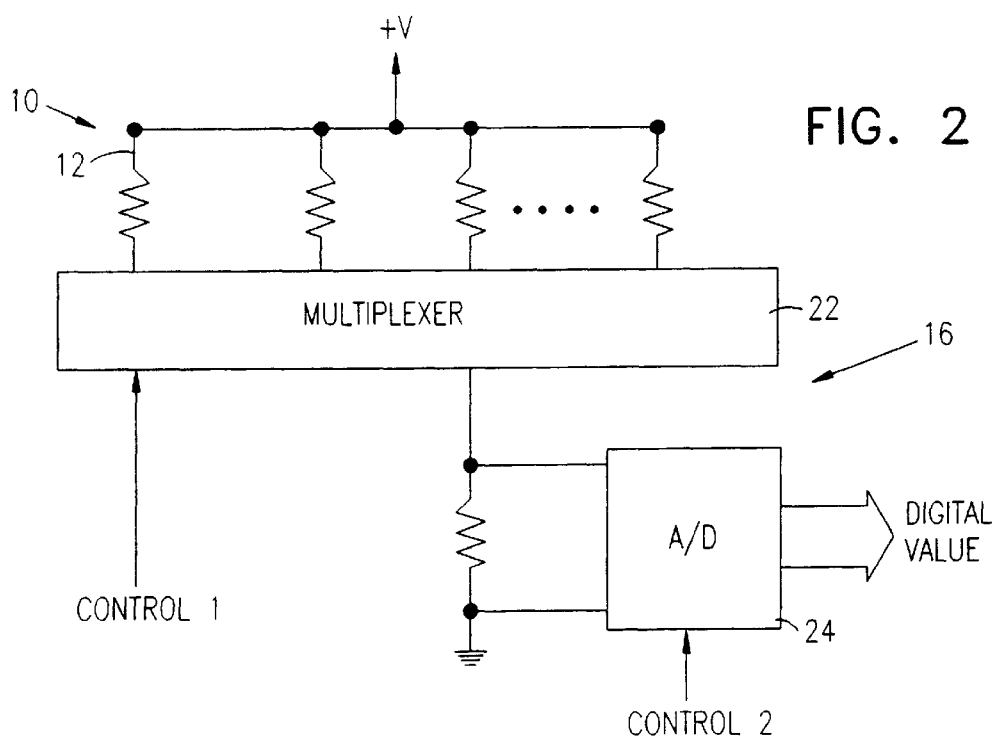

ELECTRONIC FILAMENT NETTING

FIELD OF THE INVENTION

The present invention relates generally to security nets and meshes and particularly to an electronic security net or mesh for placing around cargo and the like.

BACKGROUND OF THE INVENTION

It is essential to protect cargo, freighted by ship, air, rails or truck, from tampering and theft. Valuable cargo passing through freight terminals is prone to attempts by unscrupulous persons to open the cargo and pilfer the contents. Thus there is a well established need for simple and efficient apparatus for monitoring cargo and alerting of attempts to tamper with or steal the contents.

SUMMARY OF THE INVENTION

The present invention seeks to provide simple and efficient apparatus for monitoring cargo and alerting of attempts to tamper with or steal the contents. The present invention provides an electronic filament netting which includes electrical monitoring apparatus. The netting is draped over the object to be protected and any attempt to tamper with the netting causes a change in an initial electrical parameter, which change is communicated to the electronic monitoring apparatus which can then actuate an alarm.

There is thus provided in accordance with a preferred embodiment of the present invention an electronic filament netting including a warp of a first plurality of wires woven together with a weft of a second plurality of wires, wherein a random number of the warp and the weft wires are electrically connected to electronic monitoring apparatus so as to create a random electrical connection which defines an initial electrical parameter, wherein a change in the initial electrical parameter is communicated to the electronic monitoring apparatus.

In accordance with a preferred embodiment of the present invention the warp and the weft wires are electrically connected in a random manner to a bus in electrical communication with the electronic monitoring apparatus.

Further in accordance with a preferred embodiment of the present invention the warp and the weft wires are embedded in a material suitable for draping over an object to be protected.

Still further in accordance with a preferred embodiment of the present invention the warp and the weft wires are pre-manufactured in random electrical connection with the bus.

Additionally in accordance with a preferred embodiment of the present invention the bus is attached to an object to be protected.

In accordance with a preferred embodiment of the present invention at a junction between one of the warp wires and one of the weft wires, either one of the warp wires or weft wires is looped around the other wire.

Further in accordance with a preferred embodiment of the present invention the warp and the weft wires include electrically resistive elements.

Still further in accordance with a preferred embodiment of the present invention at least one of the warp and the weft wires includes a multiplicity of resistive wires, wherein only a random number of the resistive wires are electrically connected to an electrical terminal of the electronic monitoring apparatus.

Additionally in accordance with a preferred embodiment of the present invention the electronic monitoring apparatus includes a multiplexer to which are electrically connected the warp and the weft wires.

BRIEF DESCRIPTION OF THE DRAWINGS

The present invention will be understood and appreciated more fully from the following detailed description, taken in conjunction with the drawings in which:

FIGS. 1 and 2 are simplified block diagrams of an electronic filament netting constructed and operative in accordance with a preferred embodiment of the present invention;

DETAILED DESCRIPTION OF A PREFERRED EMBODIMENT

Figure 3:
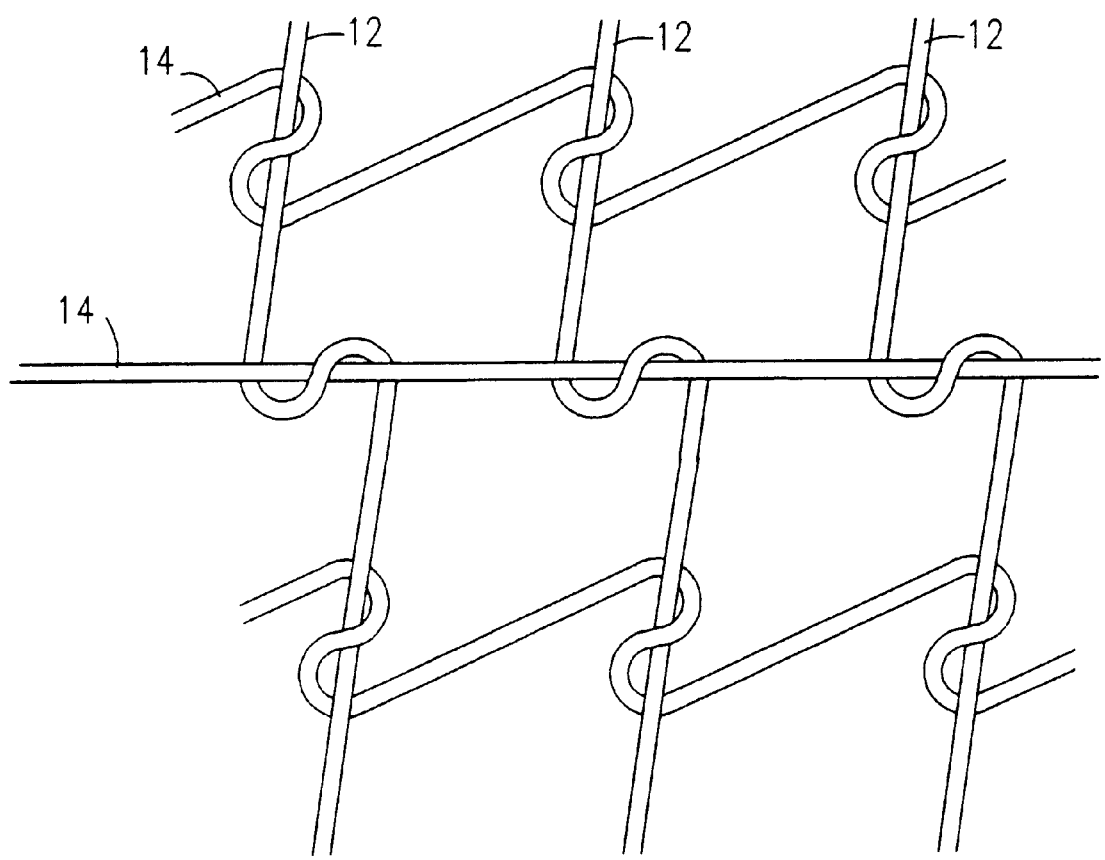
FIG. 3 is a simplified illustration of warp and weft wires looped around each other in the electronic filament netting of FIG. 1.

Reference is now made to FIGS. 1 and 2 which illustrate in block diagram form an electronic filament netting 10. Netting 10 preferably includes a warp of a first plurality of wires 12 woven together with a weft of a second plurality of wires 14, wherein a random number of warp and weft wires 12 and 14 are electrically connected to electronic monitoring apparatus 16.

Preferably the random connection is accomplished by electrically connecting the warp and weft wires 12 and 14 in a random manner to a bus 18 in electrical communication with electronic monitoring apparatus 16. Bus 18 is preferably simply an electrically conductive wire, although other constructions of busses may be employed as well.

Warp and weft wires 12 and 14 may be draped as is over an object to be protected, or alternatively, may be embedded in a material 20, such as a cloth or tarpaulin, suitable for draping over the object to be protected. Warp and weft wires 12 and 14 may be pre-manufactured in random electrical connection with bus 18, in which case bus 18 is preferably embedded in material 20 as well. Alternatively, bus 18 itself is attached to the object to be protected. For example, a cargo palette may be manufactured or reworked to have bus 18 embedded therein. After placing netting 10 over the object to be protected, the ends of warp and weft wires 12 and 14 may then be randomly attached to bus 18. In any case, the random electrical connection defines an initial electrical parameter, such as resistance, capacitance or inductance, for example, and a change in the initial electrical parameter is communicated to electronic monitoring apparatus 16 for monitoring and alerting of any attempt of tampering or theft.

Electronic monitoring apparatus 16 preferably includes, inter alia, a multiplexer 22 (ends of the wires being preferably connected to terminals of multiplexer 22), which operates in conjunction with an analog-to-digital converter 24. Preferably one multiplexer is provided for the warp and another for the weft. Electronic monitoring apparatus 16 polls the wires via multiplexers 22 and checks if there has been any change in the initial electrical parameter. Any change detected actuates alarm apparatus to alert of possible tampering. Data relating to the electrical parameter may be sent via the A-D converters 24 as a digital value to a remote monitoring station, such as a station 26 shown in FIG. 5, which is in either wired or wireless communication with electronic monitoring apparatus 16. Suitable controllers may be provided for controlling any portion of electronic monitoring apparatus 16.

In accordance with a preferred embodiment of the present invention, in order to enhance security, electronic monitoring apparatus 16 communicates with monitoring station 26 in an encrypted manner. For example, well known encryption algorithms, such as RC-5, DES or DVB, may be employed. To provide an even greater level of trust, mutual zero-knowledge interaction authentication sessions between electronic monitoring apparatus 16 and monitoring station 26 may be held, such as the so-called Fiat-Shamir authentication methods taught in U.S. Pat. No. 4,748,668 to Shamir and Fiat, the disclosure of which is incorporated herein by reference.

Referring now to FIG. 3, it is seen that preferably that at a junction between one or more of warp wires 12 and weft wires 14, either one of the wires is looped around the other wire. This arrangement ensures that the wires cannot be lifted away from the object to be protected without changing the electrical parameter and thus ensures that the alarm apparatus will be alerted. The skilled artisan will appreciate that warp wires 12 and weft wires 14 may be arranged in other manners to achieve this goal.

The circuitry comprising wires 12 and 14, electronic monitoring apparatus 16 and bus 18, is preferably constructed in accordance with the teachings of U.S. patent application No. 08/815,389, the disclosure of which is incorporated herein by reference. As such, warp and weft wires 12 and 14 may be electrically resistive elements. Warp and weft wires 12 and 14 may include a multiplicity of resistive wires, wherein only a random number of the resistive wires are electrically connected to an electrical terminal of electronic monitoring apparatus 16. As described in U.S. patent application No. 08/815,389, the wires 12 and 14 would in this case be preferably constructed of a high resistivity material such as nickel chrome. Each wire is preferably insulated from each other and from the external world. The random connection of the wires to electronic monitoring apparatus 16 results in a statistically random electrical resistance, which resistance cannot be measured from outside netting 10. Alternatively, warp and weft wires 12 and 14 may be electrically inductive or capacitive elements. As another alternative, warp and weft wires 12 and 14 may be frangible elements which when broken alert of a change in the initial electrical parameter.

Figures 4, 5:
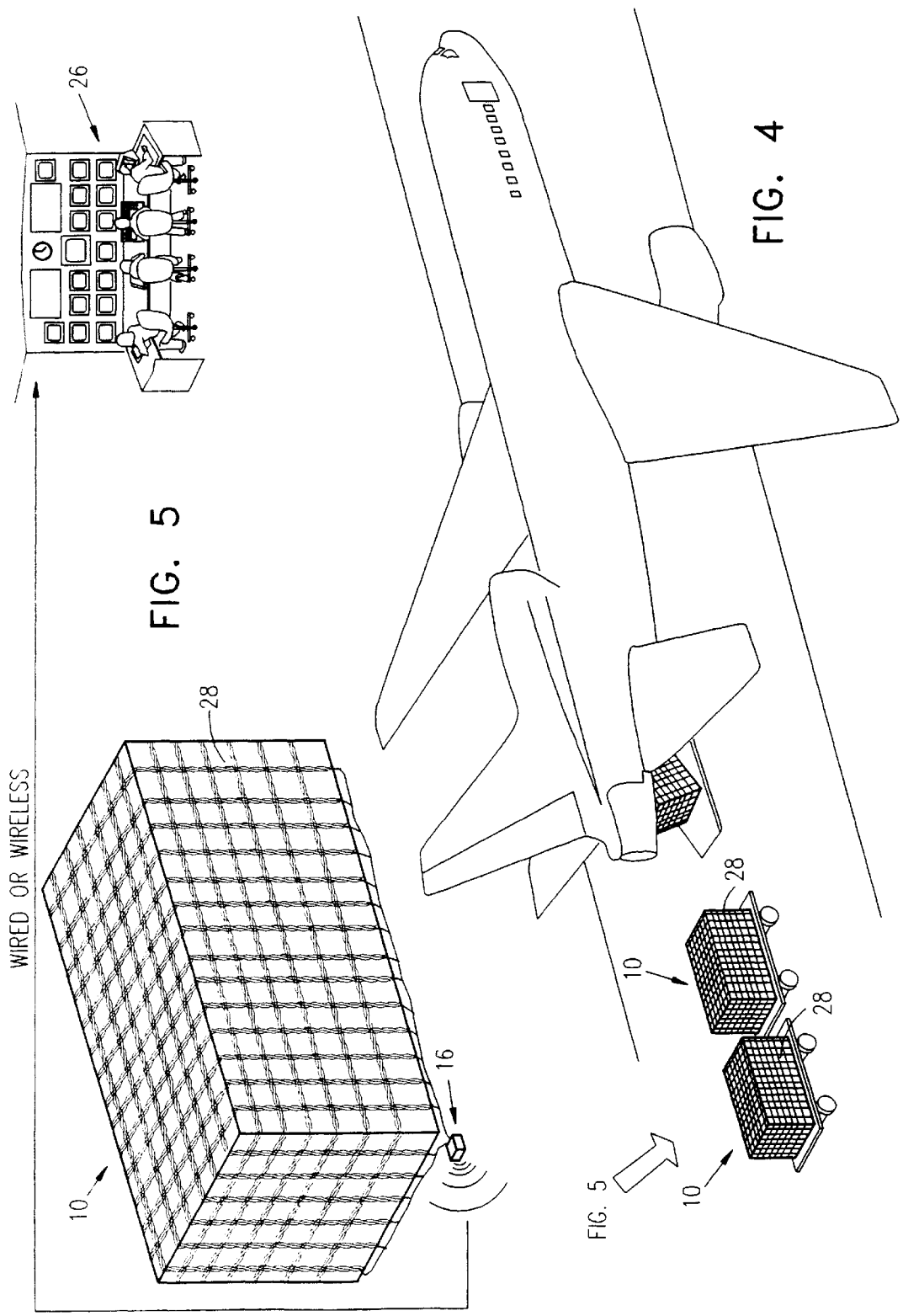
FIGS. 4 and 5 are simplified illustrations of the electronic filament netting of FIG. 1 placed around airplane cargo.
Figure 6:
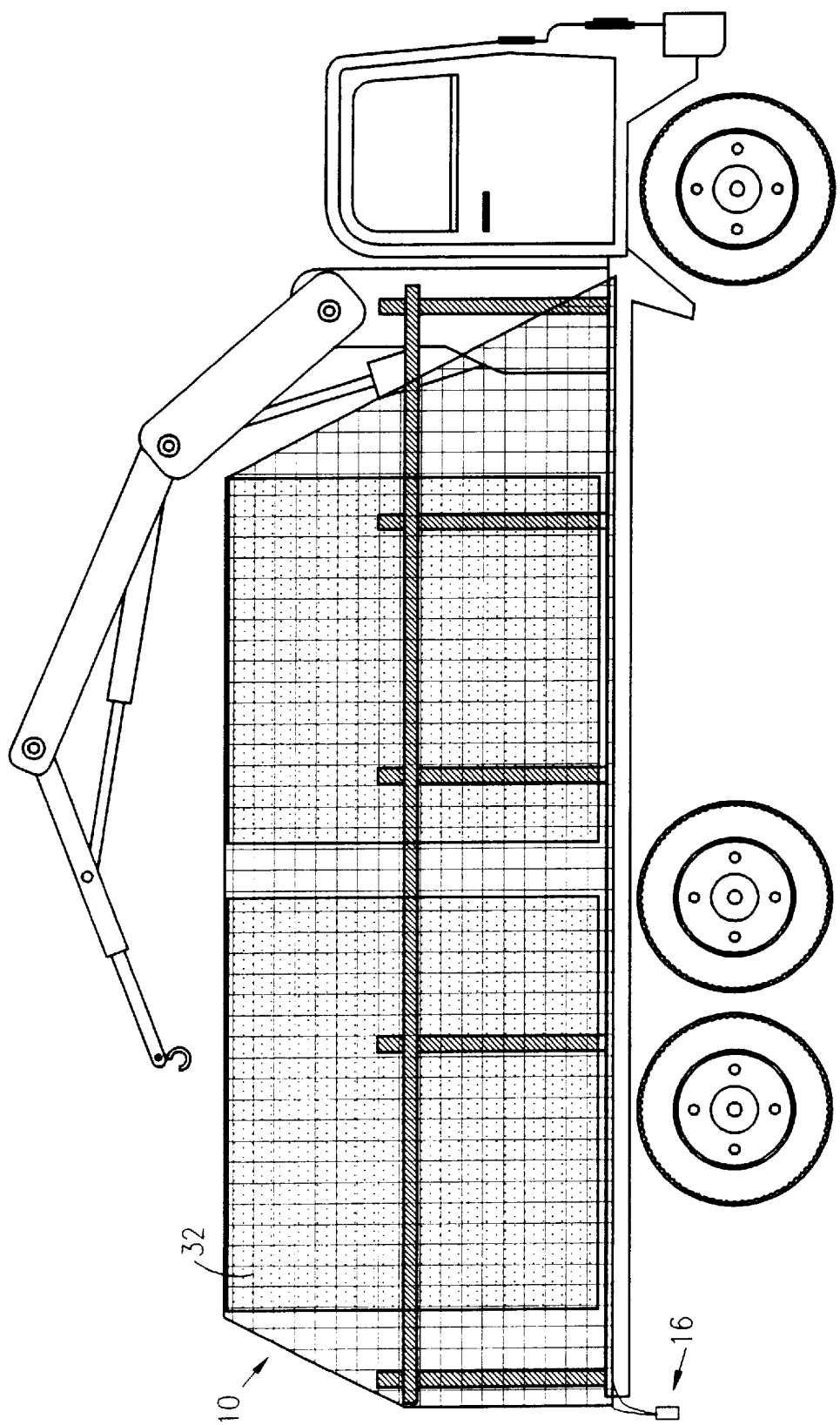
FIG. 6 is a simplified illustration of the electronic filament netting of FIG. 1 placed around truck cargo.

Referring to FIGS. 4, 5 and 6, it is seen that electronic filament netting 10 may be placed around airplane cargo 28 (FIGS. 1 and 2) and truck cargo 30 (FIG. 6).

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. An electronic filament netting comprising:

a warp of a first plurality of wires woven together with a weft of a second plurality of wires, wherein a random number of said warp and said weft wires are electrically connected to electronic monitoring apparatus so as to create a random electrical connection which defines an initial electrical parameter, wherein a change in said initial electrical parameter is communicated to said electronic monitoring apparatus.

2. The electronic filament netting according to claim 1 wherein said warp and said weft wires are electrically connected in a random manner to a bus in electrical communication with said electronic monitoring apparatus.

3. The electronic filament netting according to claim 2 wherein said warp and said weft wires are pre-manufactured in random electrical connection with said bus.

4. The electronic filament netting according to claim 2 wherein said bus is attached to an object to be protected.

5. The electronic filament netting according to claim 1 wherein said warp and said weft wires are embedded in a material suitable for draping over an object to be protected.

6. The netting according to claim 1 wherein at a junction between one of said warp wires and one of said weft wires, said one of said warp wires is looped around said one of said weft wires.

7. The netting according to claim 1 wherein at a junction between one of said warp wires and one of said weft wires, said one of said weft wires is looped around said one of said warp wires.

8. The netting according to claim 1 wherein said warp and said wear wires comprise electrically resistive elements.

9. The netting according to claim 1 wherein said warp and said weft wires comprise electrically capacitive elements.

10. The netting according to claim 1 wherein said warp and said weft wires comprise electrically inductive elements.

11. The netting according to claim 1 wherein at least one of said warp and said weft wires comprises a multiplicity of resistive wires, wherein only a random number of said resistive wires are electrically connected to an electrical terminal of said electronic monitoring apparatus.

12. The netting according to claim 1 wherein said electronic monitoring apparatus comprises a multiplexer to which are electrically connected said warp and said weft wires.

13. The netting according to claim 1 and further comprising a monitoring station in communication with said electronic monitoring apparatus.

14. The netting according to claim 13 wherein said monitoring station is in encrypted communication with said electronic monitoring apparatus.

15. The netting according to claim 14 wherein said encrypted communication comprises a mutual zero-knowledge interaction authentication session.

* * * * *